April 8, 1952          F. A. FIRESTONE          2,592,135

INSPECTING SOLID PARTS BY SUPERSONIC SHEAR WAVES

Filed June 28, 1945          2 SHEETS—SHEET 1

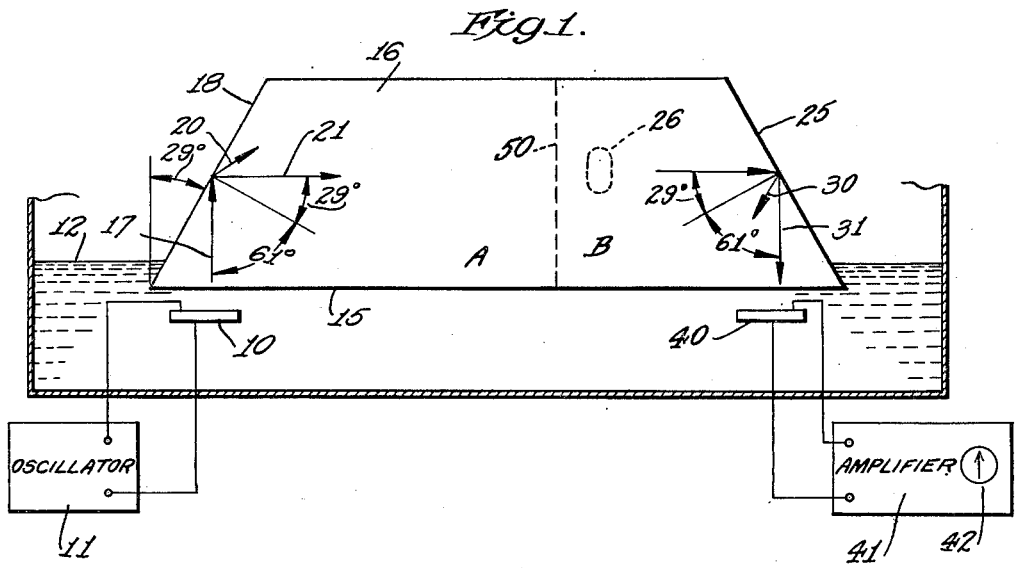

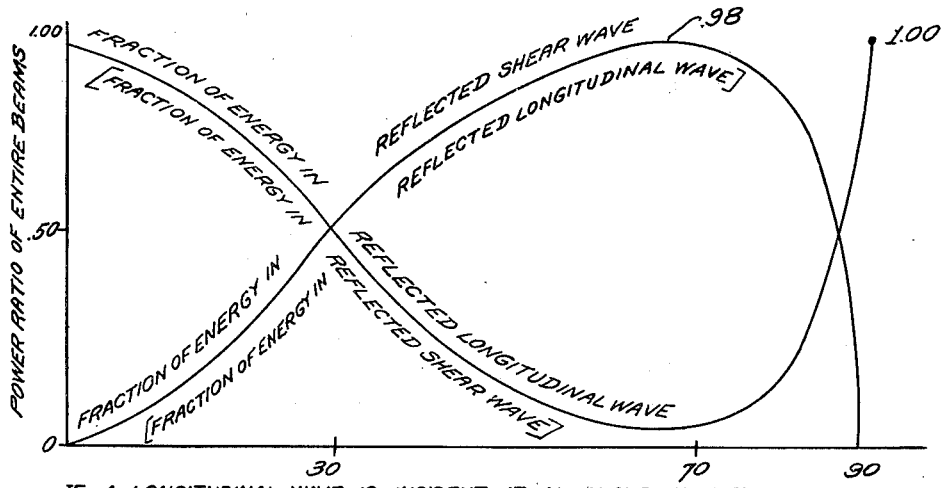

IF A LONGITUDINAL WAVE IS INCIDENT AT AN ANGLE INDICATED BY THE ABSCISSA, READ UNBRACKETED DESIGNATIONS ON THE CURVES.
[IF A SHEAR WAVE IS INCIDENT AT AN ANGLE SUCH THAT THE ANGLE OF REFLECTION OF THE RESULTING LONGITUDINAL WAVE IS INDICATED BY THE ABSCISSA, READ THE BRACKETED DESIGNATION ON THE CURVES.]

INVENTOR.
FLOYD A. FIRESTONE
BY
Joseph H. Lipschutz
ATTORNEY

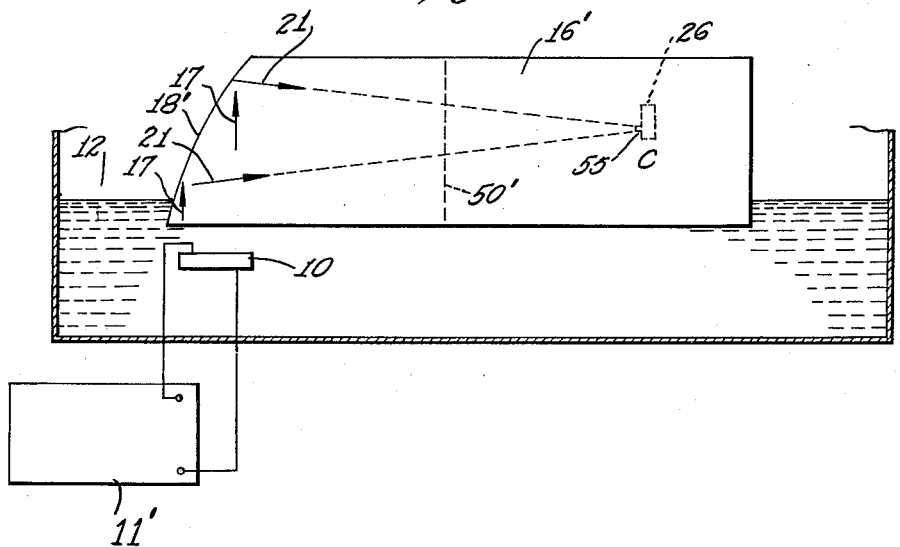

Patented Apr. 8, 1952

2,592,135

UNITED STATES PATENT OFFICE 2,592,135

INSPECTING SOLID PARTS BY SUPERSONIC SHEAR WAVES

Floyd A. Firestone, Ann Arbor, Mich., assignor to Sperry Products, Inc., Hoboken, N. J., a corporation of New York Application June 28, 1945, Serial No. 602,104

8 Claims. (Cl. 73—67)

This invention relates to testing of solids for fissures and other defects and variations by means of a supersonic wave which is transmitted into the solid. Variations in the amount of such waves passing through the solid, or in the time it takes the waves to be reflected from a bounding surface of the part or from a defect, will give an indication of the presence of defects or a measurement of distance between the surfaces of the part.

There are several types of supersonic waves, such as longitudinal, shear and surface waves. For certain types of defects, one kind of waves may be more suitable than the others. Shear waves have certain inherent advantages in the inspection of material. The velocity of propagation of shear waves is about one-half that of longitudinal waves, and therefore at the high frequency limit shear waves of about one-half of the wave length of longitudinal waves can be produced. This is highly desirable because the shorter the wave length, the smaller the flaw that can be detected, especially by reflection. A further advantage of shear waves lies in the fact that if a defect within a part under inspection by supersonic waves is filled with a liquid, longitudinal waves would still pass through it and its presence might not be detected by the transmission method. Shear waves, however, are not transmitted through liquid, and a defect filled with liquid would be a complete barrier to them. A shear wave is defined as a wave in a solid in which the particle displacements are at right angles to the direction of propagation.

It is therefore one of the principal objects of this invention to provide a method and means for generating shear waves in a solid part.

It is a further object of this invention to generate shear waves in a solid part when only a source of longitudinal waves is available.

It is still another object of this invention to inspect the interior of a solid part by means of a beam of shear waves the focus of which may be concentrated on a region to be inspected.

Further objects and advantages of this invention will become apparent in the following detailed description thereof.

In the accompanying drawings,

Fig. 1 is a vertical section, largely diagrammatic, showing one form of this invention.

Fig. 2 is a graph illustrating the relationship between longitudinal and shear waves.

Fig. 3 is a view similar to Fig. 1 showing another form of this invention.

Referring to Fig. 1, there is shown a typical arrangement embodying my invention. It embodies the principle that when a longitudinal supersonic wave is reflected, there are produced a longitudinal wave and a shear wave which are reflected at different angles relative to the angle of incidence; and when a shear wave strikes a reflecting surface it gives rise to shear waves and longitudinal waves reflected at different angles relative to the angle of incidence. This makes a separation of these waves possible by controlling the angle of incidence, and thus the shear wave may be generated within a solid part and utilized for inspection purposes independently of the longitudinal wave in the part. In the Fig. 1 form, the longitudinal supersonic wave may be generated by a quartz crystal 10 energized by an oscillator 11. The longitudinal waves may be generated in a liquid such as an oil bath 12 and are transmitted in a direction normal to the crystal and normal to a surface 15 of a solid part 16 into the said part in the direction of arrow 17. The solid may be provided with a bevelled end 18 at a predetermined angle to the base 15, the angle here shown being 29°. This means that the angle of incidence of the supersonic beam traveling in the direction of arrow 17 will be 61°, (the angle of incidence being measured from the normal to the surface). Upon the longitudinal wave striking end wall or surface 18, there are produced two waves—a longitudinal wave 20 and a shear wave 21—which are reflected to different degrees. The longitudinal wave is reflected at an angle equal to the angle of incidence (in this case 61°), while the shear wave is reflected at a considerably smaller angle (in this case, 29°). Calculation shows that if the part 16 is of steel whose reflecting surface is free, i. e., not against oil or any other liquid or solid, and the angle of incidence of the longitudinal wave 17 lies between 60° and 74°, at least 98% of the energy in the incident longitudinal wave will go into the reflected shear wave 21 and only the small remaining energy will go into the reflected longitudinal wave 20. If the angle of incidence of wave 17 lies anywhere between 29° and 87°, at least 50% will go into the reflected shear wave. Thus, the reflection of an incident longitudinal wave at an angle of incidence in the neighborhood of 65° is an excellent method for producing strongly energized shear waves.

In the case shown in Fig. 1, the longitudinal wave 17 is at an angle of incidence of 61° while the angle of reflection of the shear wave is 29°, so that by inclining the surface 18 by 29° from the vertical, the shear wave may be caused to travel horizontally through the solid until it strikes the opposite wall 25. By inclining this wall to the necessary extent (in this case, 29° from the vertical in the opposite direction of inclination from wall 18), the beam 21 incident upon surface 25 at an angle of incidence of 29° will, upon reflection, give rise to two beams, a beam 30 of shear waves which will be reflected at 29° to the normal and a beam 31 of longitudinal waves which will be reflected at 61°. At this angle of incidence, 98% of the energy in the shear wave beam 21 is converted into longitudinal wave 31 and only the small remainder resides in the shear waves 30. The waves 31, being normal to surface 15 of the solid, are transmitted through the oil to the receiving crystal 40 which is operatively connected to an amplifier 41 whose output may operate any suitable indicator 42. Any flaw such as 26 lying in the path of the shear wave 21 will cause a reduction in the output of amplifier 41 which will be indicated by indicator 42.

The relationship between the angles of incidence or reflection of longitudinal and shear waves is given by the following formula:

$$\frac{\sin \theta_L}{V_L} = \frac{\sin \theta_S}{V_S}$$

where $\theta_L$ and $V_L$ are angle of incidence or reflection and velocity of propagation of longitudinal waves in the solid, and $\theta_S$ and $V_S$ are the angle of incidence or reflection and velocity of propagation of shear waves in the solid.

Fig. 2 is a graph showing the relation of the amounts of energy in the reflected longitudinal and shear waves for given angles of incidence of a longitudinal wave. This relationship is shown by reading the upper labels. Since the sum of the energies in the reflected longitudinal and reflected shear waves must equal the energy of the incident wave, at those angles of incidence where the incident longitudinal wave gives rise to a small reflected wave the energy in the reflected wave is high. The same curves may be used for the case of an incident shear wave by reading the lower labels in the brackets.

Instead of measuring the amount of waves transmitted through the solid part and detecting the presence of defects by diminutions in the amount, the method disclosed in my Patent No. 2,280,226, granted April 21, 1942, may be employed wherein the crystal 10 would send a wave train into the solid part and the shear waves would be reflected from the defect 26, and reconverted into longitudinal waves which are then received at the sending point. The return may be detected by the same crystal 10, as disclosed in said patent, and an indication obtained on an oscilloscope.

It may be found impractical to prepare test pieces with the beveled ends 18 and 25 to provide the necessary angles of incidence for the longitudinal and shear waves. In such case, the member 16 may be cut off along dotted line 50 so that the piece A remaining at the left serves as a permanent installation to provide a source of shear waves. Objects to be tested may then be affixed to this piece at the right thereof, with the face of the object adjoining the piece A along the face 50. Similarly, the portion B may be utilized by itself as a permanent installation for receiving shear waves and converting them into longitudinal waves, when an object is affixed to said portion B along face 50 and shear waves are passed through the object.

The crystals 10 and 40 need not necessarily radiate and receive their waves through the oil 12 but may actually touch the surface of part 16 and be affixed thereto with cement or make contact through a thin oil film. The arrangement shown in Fig. 1 is, however, advantageous if the object to be inspected is long in a direction at right angles to the paper, in which case the object can be moved past the crystals without touching them and therefore no wear on the crystals is produced.

In Fig. 3 there is disclosed a modified form of my invention which is adapted for the intensive inspection of a small localized region. For this purpose means are provided for focusing a plurality of beams of shear waves at the desired point of inspection. Thus, if an object 16' is to have a localized region C tested for flaws, the surface 18' thereof which receives the incident longitudinal wave beams 17 is formed with cylindrical or spherical curvature, or some modification or combination thereof, which will give rise to a plurality of reflected shear wave beams which converge to a focal point 55 in the region C. A flaw 26 lying near this focal point will give rise to a strong reflection of shear waves back to the face 18', which upon reflection will become a longitudinal wave which will return to crystal 10. If the crystal 10 is connected to a combined supersonic wave train generator and receiver 11', as disclosed in my said patent, this arrangement will constitute an extremely sensitive method for detecting small flaws lying in the vicinity of focal point 55. As an alternative, the right hand end of solid 16' may be similarly curved and used for picking up waves after they have passed through the focal point and converting them into a downwardly traveling longitudinal beam which may be received by a crystal such as 40 of Fig. 1. The arrangement would be similar to Fig. 1 except that the waves would pass through a focus within the part. Such an arrangement would be extremely sensitive to the detection of flaws by the method of transmission, where the flaws were located in the region of the focal point. As in the Fig. 1 form, the left portion of block 16' may be cut off along line 50' and used for testing solid parts by placing this portion against the part to be inspected.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of inspecting solid parts for flaws, comprising generating supersonic longitudinal waves, transmitting the longitudinal waves through the solid part onto an intercepting free surface of the part and at such angle to said free surface that the resulting shear waves will be transmitted through the portion of said solid part to be tested.

2. The method of inspecting solid parts for flaws, comprising generating supersonic longitudinal waves, transmitting the longitudinal waves through the solid part onto an intercepting free surface of the part and at such angle to said free surface that the resulting shear waves will contain most of the energy of the incident waves and will be transmitted through the portion of said solid part to be tested.

3. The method of inspecting solid parts for flaws, which consists in generating supersonic longitudinal waves, transmitting the longitudinal waves through the solid part onto an intercepting free surface of the part and at such angle to said free surface that the resulting shear waves will be transmitted through the portion of said solid part to be tested and will be reflected from a free surface of the solid part at such angle as to produce longitudinal waves, and measuring the resulting longitudinal waves.

4. The method of inspecting solid parts for flaws, which consists in generating supersonic longitudinal waves, transmitting the waves through the solid part onto an intercepting free surface of the part and at such angle to said free surface that the resulting shear waves will be transmitted through the portion of said solid part to be tested and will be reflected from a free surface of the solid part, said last-named free surface being so positioned as to produce longitudinal waves which will contain most of the energy of the incident shear waves, and measuring the resulting longitudinal waves.

5. A device for inspecting solid parts for flaws, comprising an intermediate solid member having a face in engagement with said solid part, and means for transmitting supersonic longitudinal waves through the intermediate member onto an intercepting free surface of the member, the angular relationship of said transmitted waves to said free surface being such that the resulting shear waves will be transmitted through the solid part to be tested.

6. A device for inspecting solid parts for flaws, comprising an intermediate solid member having a face in engagement with said solid part, and means for transmitting supersonic longitudinal waves through the intermediate member onto an intercepting free surface of the member, the angular relationship of said transmitted waves to said free surface being such that the resulting shear waves will contain most of the energy of the incident waves and will be transmitted through the solid part to be tested.

7. The method of inspecting solid parts for flaws, which consists in generating supersonic longitudinal waves, and transmitting the waves into the solid part onto an intercepting free surface so curved that the resulting shear waves converge to a focus in the desired region of test, reflecting the shear waves onto said free surface of the part at such angle as to produce longitudinal waves, and measuring the resulting longitudinal waves.

8. A device for inspecting solid parts for flaws, comprising means for generating supersonic longitudinal waves, an intermediate solid member having a face in engagement with said solid part and a face for receiving the generated longitudinal waves, said last-named face being so curved as to cause the resulting shear waves to converge to a focus in the said part, said second face being so formed as to receive the reflected shear waves at such angle as to produce longitudinal waves, and means for measuring the resulting longitudinal waves.

FLOYD A. FIRESTONE.

REFERENCES CITED

The following references are of record in the file of this patent:

UNITED STATES PATENTS

| Number | Name | Date |
| --- | --- | --- |
| 2,280,226 | Firestone | Apr. 21, 1942 |